United States Patent
Hame et al.

(10) Patent No.: US 10,166,619 B2
(45) Date of Patent: Jan. 1, 2019

(54) SOLDERING PUMP

(71) Applicants: Simon Hame, Kreuzwertheim (DE); Richard Kressmann, Zell am Main (DE)

(72) Inventors: Simon Hame, Kreuzwertheim (DE); Richard Kressmann, Zell am Main (DE)

(73) Assignee: ERSA GmbH, Wertheim (DE)

( * ) Notice: Subject to any disclaimer, the term of this patent is extended or adjusted under 35 U.S.C. 154(b) by 0 days.

(21) Appl. No.: 15/293,736

(22) Filed: Oct. 14, 2016

(65) Prior Publication Data

US 2017/0113291 A1 Apr. 27, 2017

(30) Foreign Application Priority Data

Oct. 21, 2015 (DE) .................. 10 2015 220 514

(51) Int. Cl.
| | | |
|---|---|---|
| *B23K 37/00* | (2006.01) | |
| *B23K 3/06* | (2006.01) | |
| *H02K 44/02* | (2006.01) | |
| *H02K 44/06* | (2006.01) | |

(52) U.S. Cl.
CPC ........... *B23K 3/0653* (2013.01); *H02K 44/02* (2013.01); *H02K 44/06* (2013.01)

(58) Field of Classification Search
CPC ...... B23K 3/06; B23K 3/0638; B23K 3/0646; B23K 3/0653; B23K 3/0661
USPC ..... 228/256–262, 33, 37, 56.1; 222/591–607
See application file for complete search history.

(56) References Cited

U.S. PATENT DOCUMENTS

| | | | | |
|---|---|---|---|---|
| 2,099,593 | A | | 11/1937 | Bender et al. |
| 2,915,973 | A | * | 12/1959 | Findlay .................. H02K 44/06 198/619 |
| 3,038,409 | A | * | 6/1962 | Edgerly ................. H02K 44/06 188/161 |
| 3,767,102 | A | * | 10/1973 | Parsons ................ B23K 3/0653 118/400 |
| 3,797,724 | A | | 3/1974 | Flury et al. |
| 3,941,088 | A | * | 3/1976 | Ronafoldi ................. C23C 2/00 118/429 |

(Continued)

FOREIGN PATENT DOCUMENTS

| | | | | |
|---|---|---|---|---|
| CA | 2733470 | A1 * | 10/2011 | ............. C22B 9/003 |
| CN | 101382153 | A | 3/2009 | |

(Continued)

OTHER PUBLICATIONS

English Language Abstract of CN 101382153B. CN 101382153B is also published as CN 101382153A.

(Continued)

*Primary Examiner* — Kiley S Stoner
(74) *Attorney, Agent, or Firm* — Ware, Fressola, Maguire & Barber LLP

(57) ABSTRACT

A soldering pump for pumping an electrically conductive fluid—in particular, a liquid solder—said soldering pump having a feed channel which travels at least in segments along a circular path and has an inlet and an outlet, and having a device for generating a moving magnetic field, wherein the device comprises at least one permanent magnet, wherein the device is designed such that the permanent magnet is moved along the feed channel during operation.

12 Claims, 4 Drawing Sheets

(56) References Cited

U.S. PATENT DOCUMENTS

| | | | | |
|---|---|---|---|---|
| 4,988,267 A | * | 1/1991 | Yamada | B22D 39/003 310/11 |
| 5,009,399 A | * | 4/1991 | Bykhovsky | B22D 39/003 222/591 |
| 5,080,559 A | * | 1/1992 | Abbin | H02N 11/006 417/48 |
| 5,191,929 A | * | 3/1993 | Kubota | B22D 17/30 164/316 |
| 5,240,382 A | * | 8/1993 | Bessho | H02K 44/06 310/11 |
| 5,981,922 A | * | 11/1999 | Masuda | B23K 3/0653 219/615 |
| 6,050,473 A | * | 4/2000 | Masuda | B23K 1/085 219/603 |
| 6,364,195 B1 | * | 4/2002 | Masuda | B23K 3/0653 228/37 |
| 2003/0080175 A1 | * | 5/2003 | Toba | B23K 3/0653 228/37 |
| 2004/0213858 A1 | | 10/2004 | Franceschetti et al. | |
| 2007/0068994 A1 | * | 3/2007 | Toba | B23K 3/06 228/101 |
| 2009/0285695 A1 | | 11/2009 | Kagan | |
| 2016/0138868 A1 | * | 5/2016 | Bosworth | C21C 5/5247 266/44 |

FOREIGN PATENT DOCUMENTS

| | | |
|---|---|---|
| CN | 101382153 B | 6/2011 |
| CN | 202334245 U | 7/2012 |
| CN | 102806398 | 12/2012 |
| DE | 2149913 | 4/1972 |
| JP | 62142066 A * | 6/1987 ........... B22D 39/003 |
| JP | H05161340 A | 6/1993 |
| JP | 2011202947 A | 10/2011 |

OTHER PUBLICATIONS

English Language Abstract of CN 101382153A. CN 101382153A is also published as CN 101382153B.

English Language Abstract of JP H05161340.

English Language Abstract of JP2011202947A. JP2011202947A is also published as JP H05161340B2.

English Language Translation of CN 202334245U.

* cited by examiner

SOLDERING PUMP

BACKGROUND OF THE INVENTION

1. Field of Invention

The invention relates to a soldering pump for conveying an electrically conductive fluid—in particular, a liquid solder—said soldering pump having a feed channel traveling at least in segments along a circular path, said feed channel having an inlet and an outlet, and having a device for generating a moving magnetic field. The invention furthermore relates to a soldering pot comprising a soldering pump, as well as a method for operating a soldering pump.

2. Description of Related Art

Such soldering pumps are already known from the prior art. The device for generating a moving magnetic field comprises at least one electromagnet.

However, the use of electromagnets has proven to be disadvantageous, since the soldering pumps take up a comparatively large installation space, and since the level of efficiency of such soldering pumps—the device of which comprises electromagnets for generating the moving magnetic field—is comparatively poor for the electromagnets or the electrical coils as a result of the electrical losses caused by the current feed.

SUMMARY OF THE INVENTION

The invention is therefore based upon the object of providing a soldering pump that avoids the mentioned disadvantages and provides, in particular, a soldering pump that has a reduced installation size and an improved level of efficiency.

This object is achieved with a soldering pump for pumping an electrically conductive fluid, including a liquid solder, having a feed channel which travels at least in segments along a circular path and has an inlet and an outlet, and having a device for generating a moving magnetic field. The soldering pump according to the invention is characterized in that the device comprises at least one permanent magnet and in that the device is designed such that the permanent magnet is moved along the feed channel during operation.

Advantageously, only the at least one permanent magnet is consequently provided for generating the moving magnetic field. As a result of the use of permanent magnets for generating the moving magnetic field, the installation size can be reduced, and a significant energy savings can be achieved, since, on the one hand, the level of efficiency of the pump can be increased by dispensing with electromagnets, and, on the other hand, the energy consumption of a system for—for example—selective wave soldering can be reduced due to the lower mass to be moved.

By means of the moving magnetic field, eddy currents can be generated in an electrically conductive fluid—in particular, in a liquid solder—during operation of the soldering pump. By generating the eddy currents, the electrically conductive fluid or the liquid solder can be accelerated in the direction of movement along the feed channel traveling at least in segments along a circular path, and a pumping effect of the soldering pump can thus be provided.

A first particularly advantageous development of the soldering pump provides that a magnetic or ferromagnetic material is arranged on the side of the feed channel that faces away from the permanent magnet. By arranging a magnetic or ferromagnetic material on the side of the feed channel that faces away from the permanent magnet, the formation of a magnetic field in the feed channel can be improved.

Another particularly advantageous embodiment of the soldering pump is characterized in that the device is designed such that, during operation, the permanent magnet rotates about an axis of rotation arranged concentrically relative to the circular path.

By rotating the permanent magnet, a rotating magnetic field which forms between the magnetic or ferromagnetic material and the permanent magnet can be generated in the feed channel which travels at least in segments along a circular path. The feed channel preferably travels between an inlet and an outlet along the circular path at a circumferential angle in a range of 140° to 350°—more preferably, at a circumferential angle in a range of 160° to 350°.

An advantageous development of the invention provides that at least two permanent magnets are provided that are arranged such that the permanent magnets face the feed channel with different magnetic poles.

In this respect, it is particularly preferred if a plurality of permanent magnets is provided which face the feed channel with different magnetic poles in alternation.

To allow for the permanent magnets to easily rotate about the axis of rotation during operation, it can be advantageously provided that the permanent magnets are arranged on a circular magnet path.

It is particularly advantageous in this respect if the circular magnet path is arranged concentrically relative to the circular path of the feed channel.

A particularly advantageous development of the soldering pump provides that the feed channel is delimited on its side facing away from the permanent magnet by a ferromagnetic material. Consequently, it can be provided that the feed channel is composed of a groove and a cover made of ferromagnetic material, covering said groove.

A particularly capable embodiment of the soldering pump for high volumetric flow rates provides that the feed channel is delimited by a ferromagnetic material that is designed as a semi-cylindrical sleeve. In this case, the feed channel is advantageously delimited on the one hand by a convex outer face of a hollow half-cylinder and, on the other hand, by a concave inner surface of a semi-cylindrical sleeve made of ferromagnetic material.

Another particularly advantageous development of the soldering pump provides that the feed channel is delimited on its side facing toward the permanent magnet by a non-ferromagnetic material. It can advantageously be provided in this case that the feed channel is introduced into the non-ferromagnetic material in the manner of a groove or an annular groove.

However, it is also conceivable that the feed channel is completely inserted into the non-ferromagnetic material and completely delimited by the non-ferromagnetic material, except for an inlet and an outlet.

A particularly simple embodiment of the soldering pump provides that the at least one permanent magnet is arranged axially below the feed channel. In this case, it is particularly preferred if the at least one permanent magnet or the plurality of permanent magnets is arranged on a disk that can be driven to rotate about the axis of rotation and is arranged orthogonal to the axis of rotation.

An advantageous development of the soldering pump may provide that the at least one permanent magnet is arranged radially inward next to the feed channel. Here, the radial direction is a direction orthogonal to the axis of rotation, whereas an axial direction is a direction parallel to the axis of rotation.

However, it is also conceivable that the at least one permanent magnet is arranged radially outward next to the feed channel. A particularly capable embodiment of the soldering pump with a large conveying action may also provide that at least one permanent magnet—preferably, a plurality of permanent magnets with alternately arranged magnetic poles—is arranged both radially inward next to the feed channel and radially outward next to the feed channel. Advantageously, the radially inward and radially outward permanent magnets are arranged such that a magnetic flux respectively forms between a north pole of a magnet and a south pole of an opposite magnet, or between a south pole of a magnet and a north pole of an opposite magnet. In this case, it has been proven to be particularly advantageous if the feed channel is completely delimited by non-ferromagnetic material, except for an inlet and an outlet.

An advantageous development of the soldering pump provides for an electric motor, wherein the at least one permanent magnet can be driven by the electric motor to rotate about the axis of rotation.

In order to generate an optimally good pumping action and in order to be able to accelerate the electrically conductive fluid or the liquid solder as well as possible by means of the generated eddy currents, it is particularly advantageous to arrange the inlet and the outlet at ends of the feed channel that face away from one another.

The object mentioned above is also achieved by a soldering pot having the inlet (16) and the outlet (18) arranged at ends of the feed channel (14) that face away from one another. Such a soldering pot is particularly advantageous, since the soldering pot as a whole takes up a smaller installation space as a result of the smaller installation size of the soldering pump, and a multitude of soldering pots can thus be arranged in a space-saving manner on one axis in a system for selective wave soldering.

The object mentioned above is furthermore achieved by a method characterized in that a magnetic field is generated between the magnetic or ferromagnetic material and the permanent magnet, and in that an eddy current is generated in the electrically conductive fluid by moving the permanent magnet along the feed channel, such that the electrically conductive fluid is moved along the circular path within the feed channel.

Additional details and advantageous embodiments of the invention are to be taken from the description below, by reference to which the embodiments of the invention illustrated in the figures are described and explained in more detail.

BRIEF DESCRIPTION OF THE DRAWING

The drawing includes FIGS. 1-7, which show.

DETAIL DESCRIPTION OF THE BEST MODE OF THE INVENTION

Figure 1:
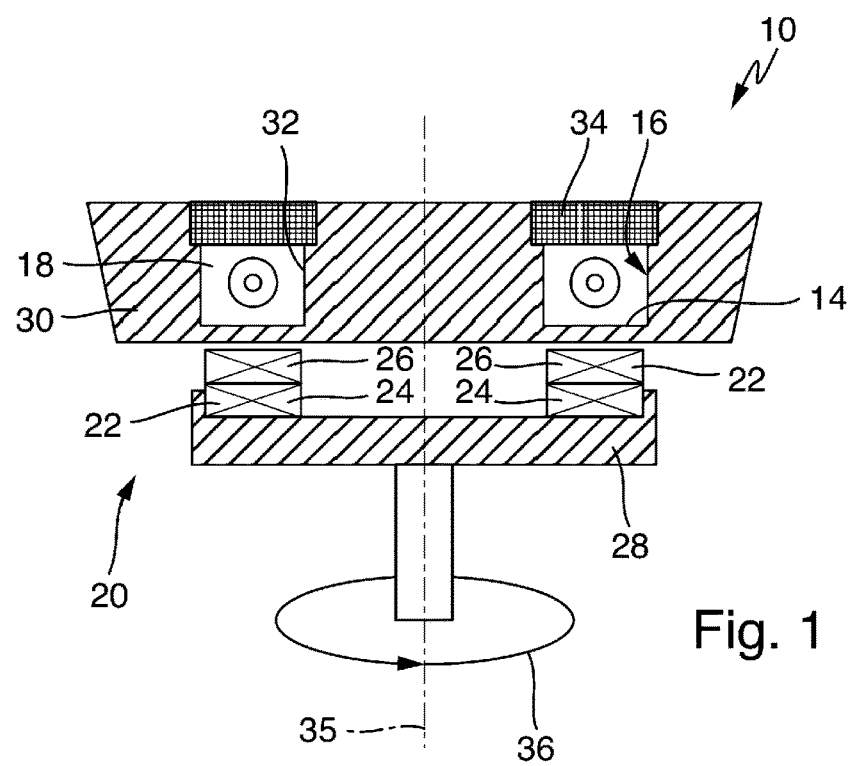
FIG. 1 a lateral view in section of a first embodiment of a soldering pump according to some embodiments of the invention.

FIG. 1 shows a lateral view in section of a first embodiment of a soldering pump 10 according to the invention. The soldering pump 10 is designed to convey an electrically conductive fluid—in particular, to convey a liquid solder. Such a soldering pump 10 may, for example, be installed in a soldering pot of a system for selective wave soldering to convey the liquid solder. However, such a soldering pot is not illustrated in the figures.

Figure 2:
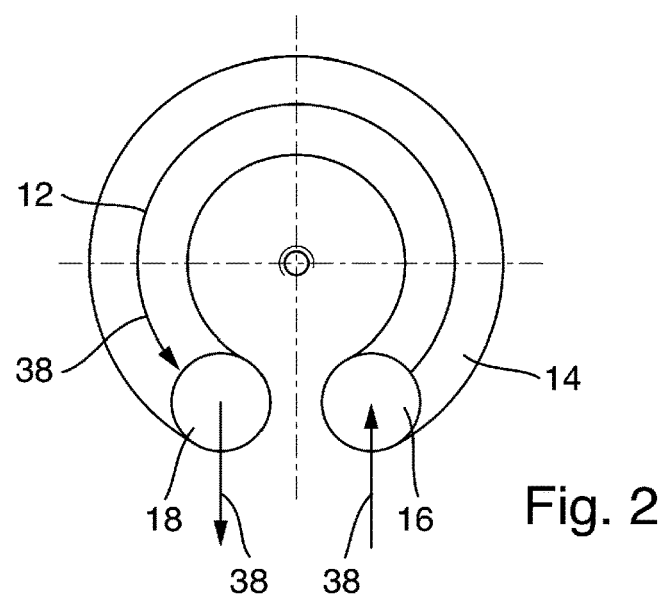
FIG. 2 a plan view of a feed channel of the soldering pump according to FIG. 1.

The soldering pump 10 comprises a feed channel 14 which travels at least in segments along a circular path 12 and has an inlet 16 and an outlet 18. A plan view of the feed channel 14 of the soldering pump 10 is shown in FIG. 2. The inlet 16, the outlet 18, as well as the circular path 12, can be seen clearly. The inlet and the outlet 18 are arranged on ends of the feed channel 14 that face away from one another.

Figure 3:
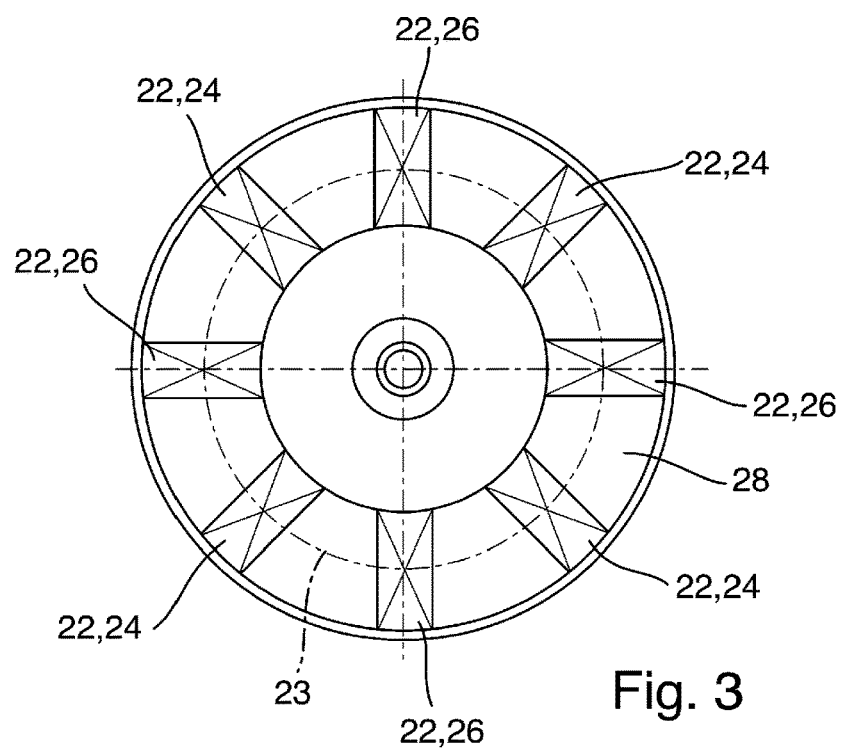
FIG. 3 a plurality of permanent magnets, arranged on a disk, of the soldering pump according to FIG. 1.

The soldering pump 10 furthermore comprises a device 20 for generating a rotating magnetic field. This device 20 comprises at least one permanent magnet 22. In the embodiment according to FIGS. 1 through 3, the soldering pump 10 or the device 20 comprises a plurality of permanent magnets 22 which alternately face the feed channel 14 with different magnetic poles. Such an arrangement of a plurality of permanent magnets 22 can be clearly seen in the plan view of FIG. 3. The permanent magnets 22 are arranged on a circular magnet path 23 which is arranged concentrically relative to the circular path 12 of the feed channel 14. The alternately arranged permanent magnets 22 can be clearly seen, wherein a permanent magnet 22 is respectively arranged with its south pole 26 upward, i.e., facing toward the feed channel 14, and the permanent magnet arranged next to it is respectively arranged with its north pole 24 upward. The permanent magnets 22 in FIG. 3 are mounted on a magnet disk 28, which can also be clearly seen in FIG. 1.

As can be seen in FIG. 1, the feed channel 14 is delimited by a non-ferromagnetic material 30 into which a groove 32 is introduced. This groove 32 is closed by a ring 34 made of ferromagnetic material, wherein the feed channel 14 as a whole is delimited by the ferromagnetic material 30 and the ring 34.

The device 20 for generating a moving magnetic field is designed such that, during operation, the permanent magnets 22 rotate about an axis of rotation 35 arranged concentrically relative to the circular path 12 or the circular magnet path 23. By rotating the permanent magnets 22 arranged axially (parallel to the direction of the axis of rotation 35) below the feed channel 14, a rotating magnetic field which forms between the magnetic or ferromagnetic material 34 and the permanent magnets 22 can be generated in the feed channel 14. By means of the rotating magnetic field, eddy currents can be generated in an electrically conductive fluid—in particular, in a liquid solder—during operation of the soldering pump 10. By generating the eddy currents, the electrically conductive fluid or the liquid solder can be accelerated in a direction of rotation, illustrated by the arrow 36 in FIG. 1 or by the arrows 38 in FIG. 2, along the feed channel 14 traveling at least in segments along the circular path 12, and a pumping effect of the soldering pump 10 can thus be provided.

For driving the magnet disk 28, the soldering pump 10 comprises an electric motor (not shown in the figures) which drives the magnet disk 28 or the permanent magnets 22 such that they rotate about the axis of rotation 35.

Figure 4:
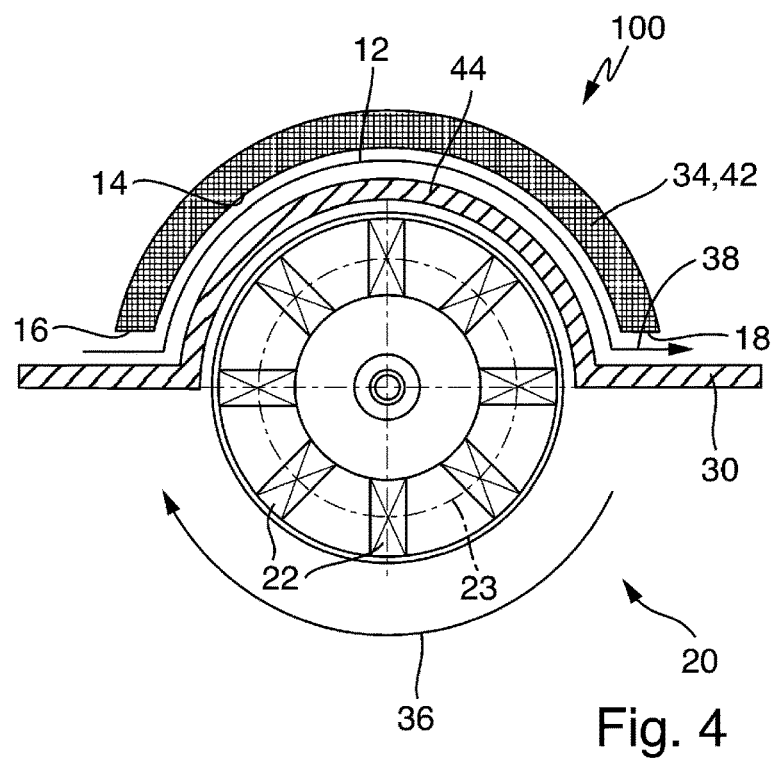
FIG. 4 a lateral view in section of a second embodiment of a soldering pump according to some embodiments of the invention.
Figure 5:
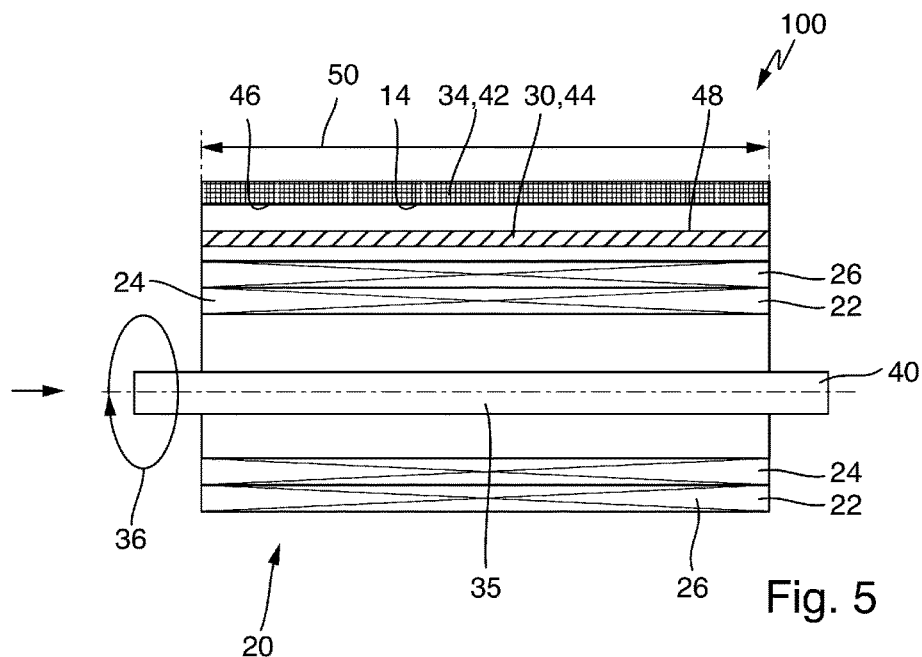
FIG. 5 a longitudinal section through the soldering pump according to FIG. 4.

FIG. 4 shows a lateral view in section of a second embodiment of a soldering pump 100 according to the invention, whereas FIG. 5 shows a longitudinal section through the soldering pump 100 according to FIG. 4. The elements and components corresponding to FIGS. 1 through 3 are designated with corresponding reference symbols.

In the second embodiment of the soldering pump 100, a plurality of permanent magnets 22 is provided which can be driven by a shaft 40, which in turn can be driven by an electric motor (not shown), to rotate about the axis of rotation 35 in the direction of the arrow 36. The permanent magnets 22 are arranged concentrically relative to the axis of rotation 35, wherein a permanent magnet 22 is respectively arranged with its south pole 26 radially outward (orthogonal to the axis of rotation 35), and the permanent magnet 22 arranged next to it is respectively arranged with its north pole 24 radially outward (orthogonal to the axis of rotation 35).

In the soldering pump 100, the feed channel 14 is delimited by a non-ferromagnetic material 30 which is designed as a semi-cylindrical sleeve 42. The feed channel 14 is furthermore delimited by a convex, hollow semi-cylinder 44, so that the feed channel 14 is formed between a concave inner face 46 of the sleeve 42 and a convex outer face 48 of the semi-cylinder 44. The design of the soldering pump 100 according to FIGS. 4 and 5 largely corresponds to the design of the soldering pump 10 according to FIGS. 1 through 3. However, the soldering pump 100 is particularly suitable for high volumetric flow rates of an electrically conductive fluid or a liquid solder, due to the large width 50 of the feed channel 14, which can be seen clearly in FIG. 5.

Figure 6:
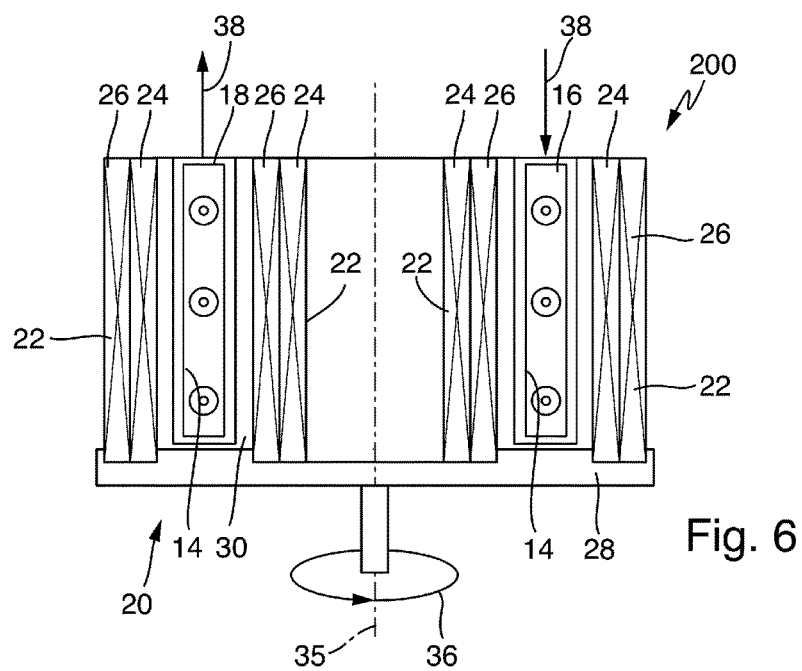
FIG. 6 a lateral view in section of a third embodiment of a soldering pump according to some embodiments of the invention.
Figure 7:
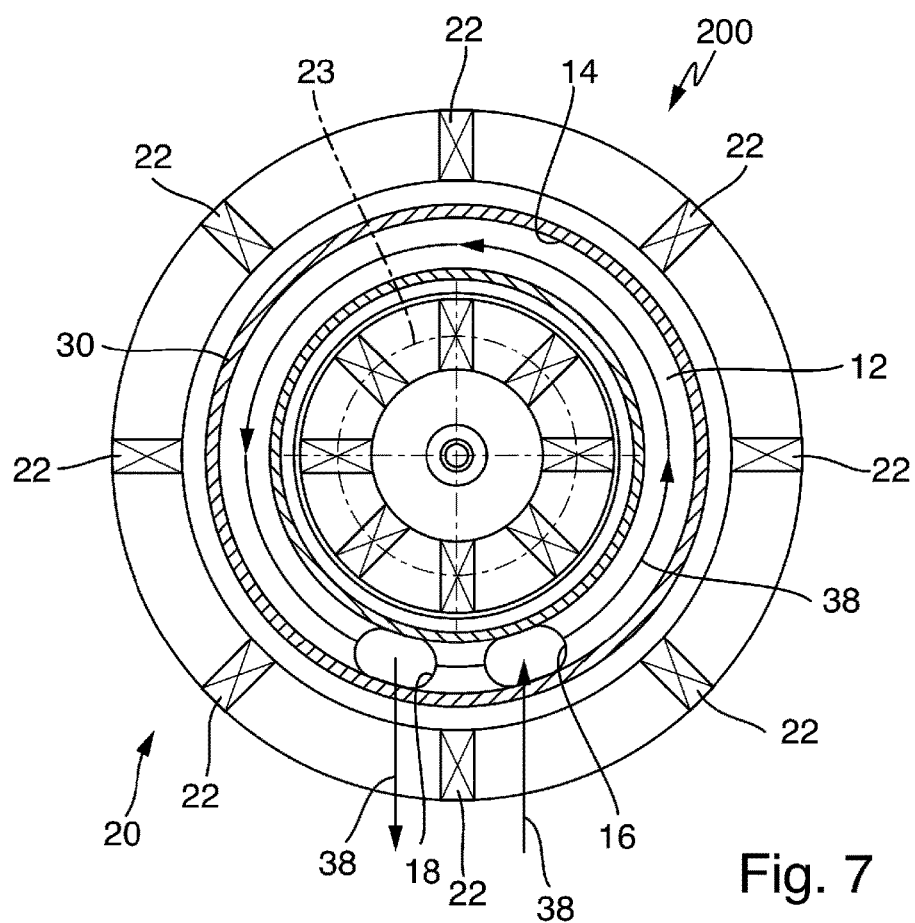
FIG. 7 a plan view in section of the soldering pump according to FIG. 6.

FIG. 6 shows a lateral view in section of a third embodiment of a soldering pump 200 according to the invention, whereas FIG. 7 shows a plan view in section of the soldering pump 200 according to FIG. 6. The elements and components corresponding to FIGS. 1 through 5 are designated with corresponding reference symbols.

The soldering pump 200 also comprises a plurality of permanent magnets 22 which are arranged on a magnet disk 28. For driving the magnet disk 28, the soldering pump 200 also comprises an electric motor (not shown in Figures) which drives the magnet disk 28 or the permanent magnets 22 such that they rotate about the axis of rotation 35.

In contrast to the soldering pump 10 of FIGS. 1 through 3, the permanent magnets 22 are arranged both radially inward (orthogonal to the axis of rotation 35) next to the feed channel 14 and radially outward (orthogonal to the axis of rotation 35) next to the feed channel. The feed channel 14 is completely delimited by a non-ferromagnetic material 30, except for the inlet 16 and the outlet 18. The permanent magnets 22 are arranged both radially inward and radially outward such that they alternately face toward the feed channel 14 with a south pole 26 or a north pole 24. As can be seen clearly in FIG. 6, the permanent magnets 22 arranged radially inward are arranged opposite the permanent magnets 22 arranged radially outward such that, on both sides of the feed channel 14, a north pole 24 and a south pole 26 of the opposing permanent magnets 22 respectively face one another.

By rotating the magnet disk 28 or the permanent magnets 22, a rotating magnetic field which forms between the respective north and south poles 24, 26 of the permanent magnets 22 can be generated in the feed channel 14. Since the magnetic flux is respectively generated between the north and south poles 24, 26, a soldering pump 200 with a particularly large conveying action can be provided overall.

SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale. Although the invention has been described and illustrated with respect to exemplary embodiments thereof, the foregoing and various other additions and omissions may be made therein and thereto without departing from the spirit and scope of the present invention.

The invention claimed is:

1. A soldering pump (10, 100, 200) for pumping an electrically conductive fluid, including a liquid solder, having a feed channel (14) which travels at least in segments along a circular path (12) and has an inlet (16) and an outlet (18), and having a device (20) for generating a moving magnetic field, the device (20) comprising a plurality of permanent magnets (22) and being designed such that the plurality of permanent magnets (22) is moved along the feed channel (14) during operation, the device (20) also being designed such that, during operation, the plurality of permanent magnets (22) rotates about an axis of rotation (35) arranged concentrically relative to the circular path (12), characterized in that the feed channel (14) is delimited by a ferromagnetic material (34) on its side facing away from the plurality of permanent magnets (22), and the feed channel (14) is delimited by a non-ferromagnetic material (30) on its side facing toward the plurality of permanent magnets (22).

2. A soldering pump (10, 100, 200) according to claim 1, characterized in that the plurality of permanent magnets (22) or ferromagnetic material (34) is arranged on a side of the feed channel (14) that faces away from the plurality of permanent magnets (22).

3. A soldering pump (10, 100, 200) according to claim 1, characterized in that the plurality of permanent magnets (22) comprises two permanent magnets (22) that are arranged such that the two permanent magnets (22) face toward the feed channel (14) with different magnetic poles (24, 26).

4. A soldering pump (10, 100, 200) according to claim 1, characterized in that the plurality of permanent magnets (22) is provided that alternately face toward the feed channel (14) with different magnetic poles (24, 26).

5. A soldering pump (10, 100, 200) according to claim 4, characterized in that the plurality of permanent magnets (22) is arranged on a circular magnet path (23).

6. A soldering pump (10, 100, 200) according to claim 5, characterized in that the circular magnet path (23) is arranged concentrically relative to the circular path (12) of the feed channel (14).

7. A soldering pump (10, 100, 200) according to claim 1, characterized in that the plurality of permanent magnets (22) is arranged axially below the feed channel (14).

8. A soldering pump (10, 100, 200) according to claim 1, characterized in that the soldering pump (10, 100, 200) is coupled to an electric motor that drives the plurality of permanent magnets (22) to rotate about the axis of rotation (35).

9. A soldering pump (10, 100, 200) according to claim 1, characterized in that the inlet (16) and the outlet (18) are arranged at ends of the feed channel (14) that face away from one another.

10. A soldering pump (10, 100, 200) for pumping an electrically conductive fluid, including a liquid solder, having a feed channel (14) which travels at least in segments along a circular path (12) and has an inlet (16) and an outlet (18), and having a device (20) for generating a moving magnetic field, the device (20) comprising a plurality of permanent magnets (22), that the device (20) being designed such that the plurality of permanent magnets (22) is moved along the feed channel (14) during operation, and the device (20) also being designed such that, during operation, the plurality of permanent magnets (22) rotates about an axis of rotation (35) arranged concentrically relative to the circular path (12), characterized in that the plurality of permanent magnets (22) is arranged radially inward next to the feed channel (14), and the plurality of permanent magnets (22) is arranged radially outward next to the feed channel (14).

11. A soldering pump (10, 100, 200) according to claim 10, characterized in that the soldering pump (10, 100, 200) is coupled to an electric motor that drives the plurality of permanent magnets (22) to rotate about the axis of rotation (35).

12. A soldering pump (10, 100, 200) according to claim 10, characterized in that the inlet (16) and the outlet (18) are arranged at ends of the feed channel (14) that face away from one another.

\* \* \* \* \*